April 26, 1960 J. W. SCHWARTZ ET AL 2,934,600

COLOR STRIPE TUBE WITH TWO DISTINCTIVE INDEXING ELEMENTS

Filed April 1, 1955 4 Sheets-Sheet 1

INVENTORS
JAMES W. SCHWARTZ AND
ROGER D. THOMPSON
BY [signature]
ATTORNEY

COLOR STRIPE TUBE WITH TWO DISTINCTIVE INDEXING ELEMENTS

Filed April 1, 1955 4 Sheets-Sheet 2

INVENTORS
JAMES W. SCHWARTZ AND
ROGER D. THOMPSON
BY [signature]
ATTORNEY

COLOR STRIPE TUBE WITH TWO DISTINCTIVE INDEXING ELEMENTS

Filed April 1, 1955 4 Sheets-Sheet 3

INVENTORS
JAMES W. SCHWARTZ AND
BY ROGER D. THOMPSON

ATTORNEY

COLOR STRIPE TUBE WITH TWO DISTINCTIVE INDEXING ELEMENTS

Filed April 1, 1955 4 Sheets-Sheet 4

INVENTORS
JAMES W. SCHWARTZ AND
ROGER D. THOMPSON
BY
ATTORNEY

United States Patent Office 2,934,600

Patented Apr. 26, 1960

2,934,600

COLOR STRIPE TUBE WITH TWO DISTINCTIVE INDEXING ELEMENTS

James W. Schwartz and Roger D. Thompson, Princeton, N.J., assignors to Radio Corporation of America, a corporation of Delaware Application April 1, 1955, Serial No. 498,472

11 Claims. (Cl. 178—5.4)

The present invention relates to new and improved image scanning apparatus and, particularly, to television image reproduction apparatus of the type employing a cathode-ray tube of the so-called horizontal "line screen" variety.

By way of illustration, one proposed form of color television image reproducing apparatus is that which includes a cathode-ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically but being in the direction parallel to the strip-like elements. Means are provided additionally to insure tracking of the groups of color elements by the electron beam components in an orderly sequence so that the video signals representative of the respectively different component colors of the image being televised are actually employed in controlling the intensity of the beam component intended to illuminate a given color producing element. Such means, which may be considered as partaking of the nature of a servo mechanism, may employ, for example, special elements associated with the target screen for sensing the vertical position of the beam components and for providing indications thereof and means responsive to such indications for maintaining correct vertical position of the beam components with respect to the lines of the screen.

It is an object of the present invention to provide new and improved image scanning apparatus which includes novel means for effectively indicating the position of an electron beam with respect to the target of such apparatus, so that the position of such beam may be accurately controlled.

Another and more specific object hereof is that of providing novel image reproducing apparatus of the type employing a line screen kinescope whose target is provided with index signal-producing means from which may be derived accurate indication of the position of an electron beam with respect thereto.

In the interest of disclosing a complete, operative embodiment of the invention, a color television image reproducing arrangement employing the principles of the invention will be described in detail. In general, the present invention provides a cathode-ray tube image scanning apparatus having means for directing a beam of electrons toward a target screen, which screen has associated therewith index signal-producing elements which are in a fixed relation to the desired scanning path of the beam and means for controlling the position of such beam in response to such index signals, the signal-producing elements having different response to electron impingement so that the index signals which are derived respectively from the elements are indicative of the position of the beam relative to such elements.

In accordance with a specific embodiment of the invention, a color kinescope of the horizontal line screen variety is provided with spaced, horizontally oriented, cathode-luminescent ultra-violet light emitting phosphor strips, certain of which strips have different delay characteristics from others of the strips. Means are additionally provided for causing an electron beam to scan along such screen in a direction parallel to the strips, the beam being "tagged" with a high frequency signal. By virtue of the different delay characteristics of the ultra-violet light emitting phosphor strips or index elements, one of such elements has the characteristic of shifting the phase of the tag signal by an amount different from that brought about by another of the index signal-producing elements. Means are provided additionally for receiving the light output from the ultra-violet light strips and for detecticng the phase of such light output, thereby providing an indication of the position of the beam with respect to the strips of different persistence characteristics. Means are further provided, in accordance with the invention, for re-positioning the electron beam, if necessary, in accordance with the phase of the index signals.

Additional objects and advantages of the present invention will become apparent to those skilled in the art from a study of the following detailed description of the accompanying drawing, in which:

Fig. 1 illustrates, by way of a block diagram, a color television receiver in accordance with one form of the invention;

Figs. 2, 2*a* and 2*b* are enlarged, fragmentary views of the kinescope of Fig. 1;

Figure 1:
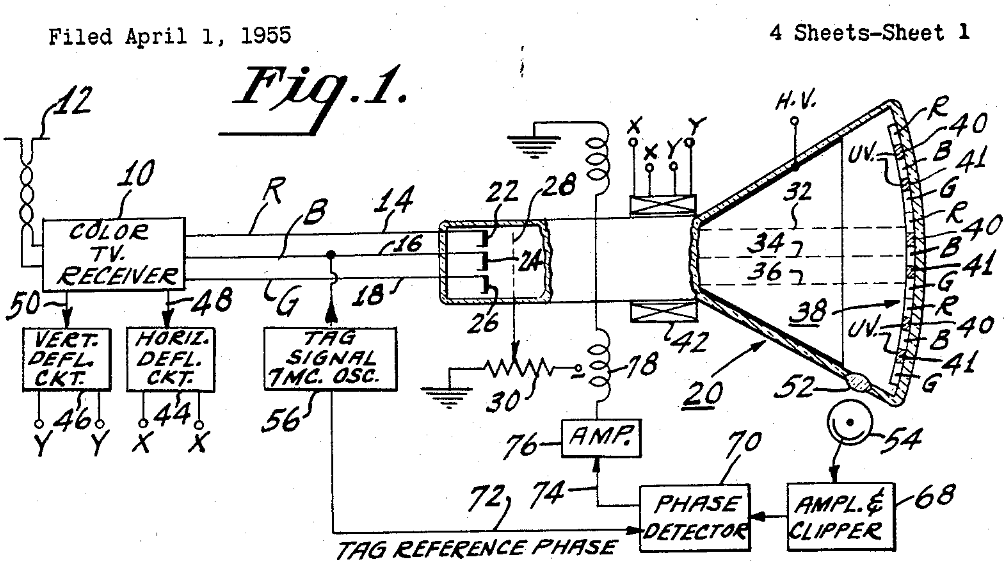

Referring to the drawing and, particularly, to Figure 1 thereof, there is shown a color televisison received 10 adapted to receive composite television signals which are intercepted by an antenna 12. Since the form of signals and the receiver required to operate thereupon do not constitute a part of the present invention, it is sufficient to note that the receiver 10 provides at its output terminals 14, 16 and 18 video signals representative of the color content, for example, red, blue and green of a television subject. By way of example, the receiver 10 may be adapted to process signals of the variety standardized by the Federal Communications Commission on December 17, 1953. Circuitry suitable for deriving simultaneous red, green and blue signals may be found, for example, in the book entitled "Practical Color Television for the Service Industry," Revised Edition, April 19, 1954, Second Edition, First Printing, published by the RCA Service Company, Inc., a Radio Corporation of America subsidiary.

The selected component color signals are applied in the following manner to a color image-reproducing kinescope 20: the red video signal appearing at the lead 14 is applied to a cathode 22 of the kinescope and the green and blue video signals are similarly applied to the cathodes 24 and 26. A control electrode 28, which may be common to all three cathodes, is connected adjustably to a potentiometer 30 which serves to set the direct current bias on the tube as a background control. The cathodes 22, 24 and 26 produce, respectively, electron beams 32, 34 and 36 which are directed toward a target screen 38 made up of a plurality of groups of horizontally disposed cathodo-luminescent phosphor strips adapted to emit red, green and blue light in response to electron beam impingement. Index signal producing elements 40 and 41 of cathodo-luminescent ultra-violet light emitting phosphor material are associated with the color phosphor strips in a symmetrical fashion. The strips 40 and 41 are chosen, respectively, of materials having respectively different response to electron impingement in a manner to be described more fully hereinafter. At this point, it may be noted that each group of color phosphor strips and the ultra-violet (UV) strips or index signal-producing elements is in the following sequence: R, UV–40, B, UV–41, G. The arrangement of the color and ultra-violet phosphor strips of the screen 38 may be better understood from the showing of Figure 2 which also illustrates the luminescent spots produced by the beams 32, 34 and 36. The beam spots are, in the interest of simplicity, designated by the same reference numerals as those which indicate the electron beams producing the spots.

The beams are caused to scan a raster made up of a plurality of horizontal line scansions by means of electromagnetic deflection fields produced by a conventional deflection yoke 42 which is supplied with horizontal and vertical sawtooth currents from the circuits 44 and 46, respectively. The deflection circuits 44 and 46 are caused to operate at television line and field frequencies (e.g. approximately 5,750 c.p.s. and 60 c.p.s.) by means of synchronizing signals derived from the received signals and applied to the deflection circuits via the leads 48 and 50.

A window, 52, transparent to ultra-violet light, is provided in the conical portion of the kinescope 20 so that ultra-violet light from the strips 40 and 41 resulting from electron impingement may pass to a light-responsive phototube 54 which may, for example, be of the multiplier type. A tag signal useful in causing the electron beams to track the phosphor strips in the desired manner is applied to the "blue" electron beam 34 as follows: a source of tag signal frequency which may take the form of an oscillator 56 producing a continuous 7 megacycles per second wave is provided. A selected phase of the 7 m.c.s. wave from the oscillator 56 is applied via a lead 58 to the cathode 24 of the kinescope. In this manner, the electron beam 34 is intensity-modulated by the tagged signal.

Figure 2:
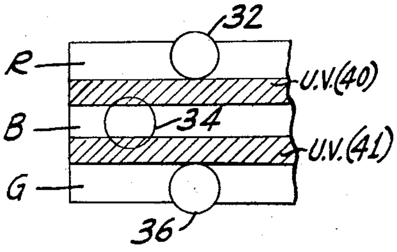
Figure 2A:
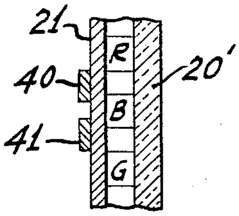

In the interest of completeness of description, it may be noted from the enlarged, vertical sectional view of Figure 2*a* that the color light emitting phosphor strips R, B and G may be deposited directly upon the rear surface of the end wall 20′ of the kinescope 20. A layer 21 of aluminum is provided in a known manner and the ultra-violet light emitting index signal strips 40 and 41 are applied to the rear surface of the aluminum layer 21.

Prior to describing the additional apparatus of Figure 1, further mention will be made of the characteristics of the index signal elements 40 and 41 which are, as has been described, ultra-violet light emitting phosphors having different delay characteristics. By "delay" is meant the fact that the cathodo-luminescent material is emitting light at a time after the cessation of excitation by electron impingement.

One manner in which delay of the type in question may occur is in employing a phosphor having a certain degree of persistence. Persistence is that quality which is due to the fact that the phosphor material has a finite decay time. That is to say, and as is known, certain luminescent phosphors, once excited by electrons, will continue to emit light for a time after the cessation of excitation and in a generally non-linear fashion. For example, a given phosphor material may have a decay characteristic proportional to the following expression: $Ae^{-kt}$, where A is the amplitude (i.e., brightness) of the light output, "$e$" is the base of the Naperian logarithm, "$k$" is a constant and "$t$" is representative of elapsed time. Thus, the "time constant" of the phosphor decay is $$\frac{1}{k}$$

so that it may be seen that $k$ is of the order of $$\frac{1}{2\pi f_c}$$

where $f_c$ is the frequency of the steady-state component exciting energy (i.e., the electron beam current) at which the amplitude response of the phosphor is equal to 0.707 times its response at very low frequencies. It is also the frequency at which the phase of the brightness or amplitude modulated light output of the phosphor lags that of the energy input by 45°.

By virtue of the fact that phosphors, in general, have persistence and, since different phosphors have been found to have different decay time constants and, therefore, different persistences, it will be appreciated that different phosphors may be chosen to have a different response to excitation.

Figure 3:
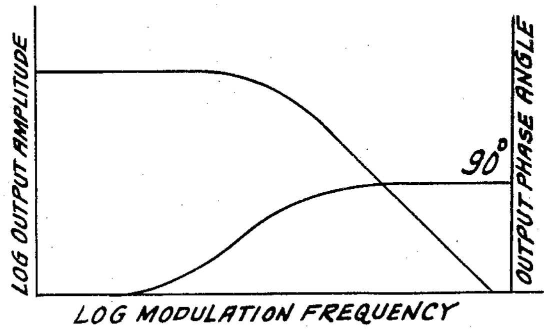
Figs. 3, 4 and 5 are graphic representations to be described.
Figure 4:
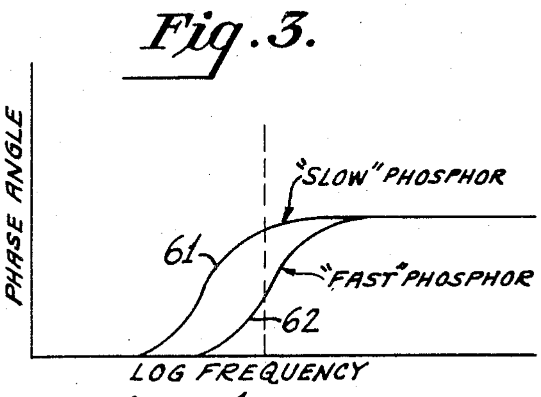

Some of the specific response characteristics of phosphors will be better understood from the showings of Figures 3 and 4. Figure 3 illustrates typical amplitude and phase versus frequency response curves of a linear phosphor, while Figure 4 shows the phase response of two different phosphors, as indicated by the curves 61 and 62. The curves 61 and 62 in Figure 4, labeled "slow" and "fast" phosphor, respectively, illustrate the fact that different phosphors having different decay characteristics will introduce different amounts of lag or phase shift in their light output with respect to their energization by alternating current, and as a function of the frequency of such alternating current. In other words, for an alternating current energization of given frequency, a phosphor having a long decay time characteristic (e.g., the slow phosphor represented by the curve 61) will introduce a greater phase shift in the signal than does a fast phosphor as indicated by the curve 62. This fact is exploited in accordance with the present invention, as indicated above in providing novel means for causing an electron beam in a scanning cathode-ray tube to travel accurately along predetermined paths.

Assuming, therefore, that the phosphor strips 40 and 41 in the apparatus of Figure 1 are, respectively, ultra-violet light emitting phosphors having different decay characteristics, such that the phosphor 40 is a slow phosphor and the phosphor 41 is a fast phosphor, the fact that the electron beam 34 is "tagged" (i.e., intensity modulated by high-frequency alternating current signal) permits accurate tracking of the electron beams along the color light emitting phosphor strips R, B and G. That is to say, the tag signal of 7 mc. s. which is applied to the cathode 24 of the kinescope from the oscillator 56 for modulating the beam 34 may be assumed as being the frequency $f_c$ shown in Fig. 4, at which frequency the different phosphors represented by the curves 61 and 62 have widely divergent phase-shift-introducing characteristics.

Figure 2B:
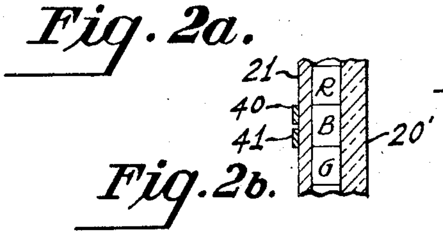

While, in Fig. 2*a*, the ultra-violet light-emitting phosphors 40 and 41 are illustrated as deposited in the "guard bands" (i.e. spaces) between the blue phosphor B and the red and green phosphors R and G, other arrangements may be employed. For example, as shown in Fig. 2*b*, the phosphors 40 and 41 may overlap the blue strip B and may even be contiguous, if of sufficient thinness, so that the guiding beam impinges substantially entirely upon ultra-violet phosphor material.

As the beams scan horizontally across the screen 38, their normal positions will be as shown by the beam spots in Fig. 2 with the tagged beam 34 located between the ultra-violet light emitting phosphor strips 40 and 41.

Any vertical displacement of the beams from their normal positions will produce a change in the ultra-violet light received by the photocell 54. That is, assuming that the beams, as by reason of scanning non-linearity, erroneously move upwardly from their normal position, the electron beam 34, modulated by the 7 megacycles per second tag signal, will impinge more upon the ultra-violet strip 40 just above it than upon the strip 41 just below it. Since, in accordance with the illustrative example, the ultra-violet strip 40 is a slow phosphor, while the strip 41 is a fast phosphor, the phase of the ultra-violet light output as received by the photocell 54 will be shifted from the "reference" phase resulting when the tagged beam is properly tracking, which reference phase bears a fixed relation to the phase of the tag signal.

Figure 5:
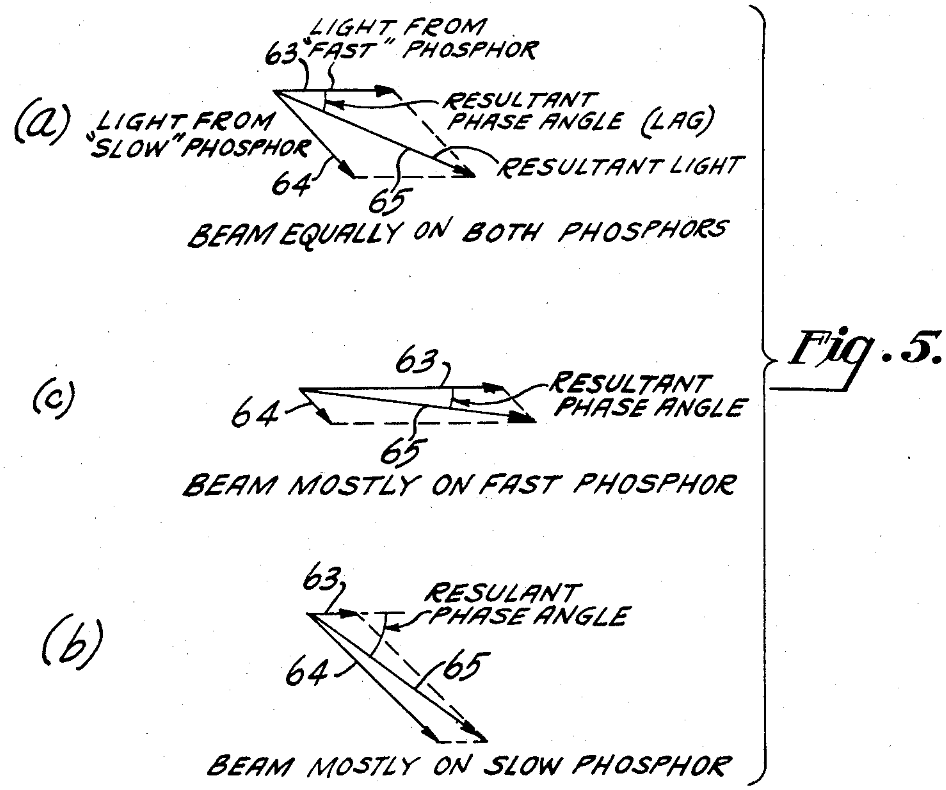

This action will be better understood from a study of the showing of Figure 5 which illustrates vectorially the phase-shifting action of the slow and fast phosphors. In Figure *5a*, the vector 63 represents the light output from the fast phosphor 41, which light has a given phase with respect to the phase of the tag signal. The vector 64 represents in a similar manner the phase and amplitude of a light output from the slow phosphor 40. The light reaching the photocell 54, therefore, is represented by the vector 65 which is the resultant of the vectors 63 and 64. This condition obtains when the electron beam 34 impinges equally on both of the phosphor strips 40 and 41. When, as assumed above, the electron beams are shifted upwardly from their proper positions, the electron beam 34 will impinge primarily upon the slow phosphor 40. The effect upon the phase of the light output of the index signal elements will then be as shown in Figure *5b* wherein reference numerals identical to those employed in Figure *5a* indicate the corresponding vectors. In Figure *5b*, the resultant vector 65 defines a greater angle with respect to the vector 63 than in the first case, the exact angle of the vector 65 being, therefore, representative of the relative position of the beam 34 with respect to the index elements 40 and 41.

When the beams are erroneously low (i.e. displaced downwardly), so that the beam 34 impinges mostly upon the fast phosphor 41, the resultant phase angle of the light output with respect to the reference (i.e., the phase bearing a fixed relation to that of the tag modulation of the beam) will be shown in Figure *5c*. This angle illustrates that the phase of the modulated light output lags behind the tagged phase by a lesser amount than was the case in Fig. *5b*.

It will thus be understood that the phase of the light output from the ultra-violet light emitting strips with respect to a reference is indicative of the direction and amount by which the electron beams 32, 34 and 36 (and, specifically, the guiding or tagged beam 34) depart from their proper positions. The ultra-violet light signals are converted into electrical signals in the photocells circuit 54, which latter signals are, in turn, amplified and clipped in a suitable circuit 68 prior to application to a phase detector 70. The phase detecor 70 also receives a selected reference phase of the 7 mc. s. tag signal from the oscillator 56 via a lead 72 and is operative to provide at its output lead 74 an electrical signal whose polarity and amplitude are a measure, respectively, of the direction and extent of mis-positioning of the beams. This electrical signal is amplified in a circuit 76 and applied to a beam position-correcting winding 78 which may be in the form of an electro-magnetic winding, as shown, arranged so that current therethrough causes vertical positioning of the beams.

From the foregoing, it will be recognized that the apparatus of Fig. 1, in accordance with the present invention, provides a relatively simple arrangement for controlling the position of an electron beam or beams in a cathode ray tube. Such control is afforded through the action of index signal-producing elements associated with the target of the tube and having different response to electron impingement, whereby signals derived from the index elements represent, by their characteristic, the position of the electron beam. In the specific apparatus of Fig. 1, the index signal elements are ultra-violet light emitting phosphor strips having different persistence characteristics so that they affect differently the phase of the 7 mc. s. amplitude variation of the light output relative to the phase of the density-modulation of the electron beam impinging thereupon. That is, the only information necessary to derive from the ultra-violet light output signal is its phase with respect to a reference, namely, the phase of the tag signal modulating the guiding beam. The various amplifying circuits and the clipper 68 may be conventional circuits well known in the art. A suitable example of a phase detector which may be employed in performing the function of the block 70 in Fig. 1 is illustrated schematically in Fig. 6.

Figure 6:
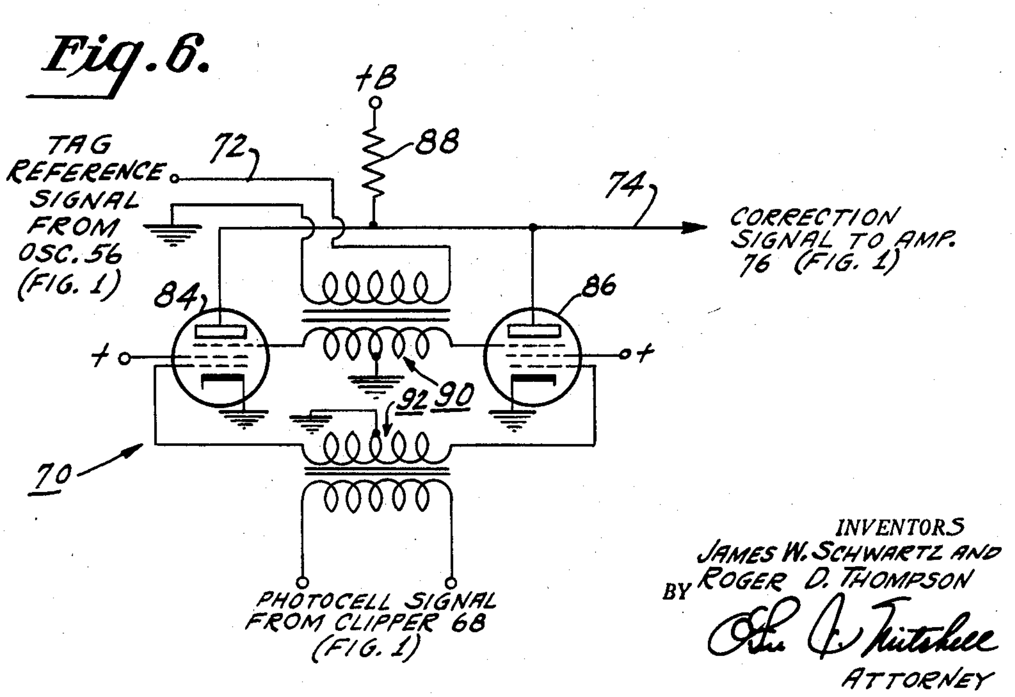
Fig. 6 is a schematic diagram of a circuit useful in performing the function of one of the blocks of Fig. 1.

In Fig. 6, there is shown a generally conventional synchronous, balanced modulator type of phase detection apparatus. A pair of pentodes 84 and 86 are connected, as shown, with a common load impedance 88 and receive opposite phases of the tagged reference signal from the oscillator on their suppressor grids via a center-tapped transformer 90. Opposite phases of the photocell signal, after clipping in the stage 68, are applied via the center-tapped transformer 92 to the control electrodes of the tubes 84 and 86. The tubes 84 and 86 perform a multiplying function and provide at their common output leads 74 a voltage proportional to the product of the input signals. By virtue of the fact that the modulators are balanced, the tag signal frequency of 7 mc.s. is cancelled by the tubes so that no energy of that frequency appears at the output. Hence, the output voltage is a direct function of the phase of the signal from the photocell circuit with respect to the phase of the tag reference signal from the oscillator. The signal at the lead 74 is, therefore, suitable for application, after amplification, to the correction winding 78 whose electromagnetic field controls the vertical position of the beams in the tube. While a balanced modulator has been illustrated, by way of example, it will also be understood that other forms of phase detection apparatus may be employed in its stead. For example, an unbalanced or single ended modulator followed by a low pass filter for removing undesired tag frequencies may be used as the phase detector.

Figure 7:
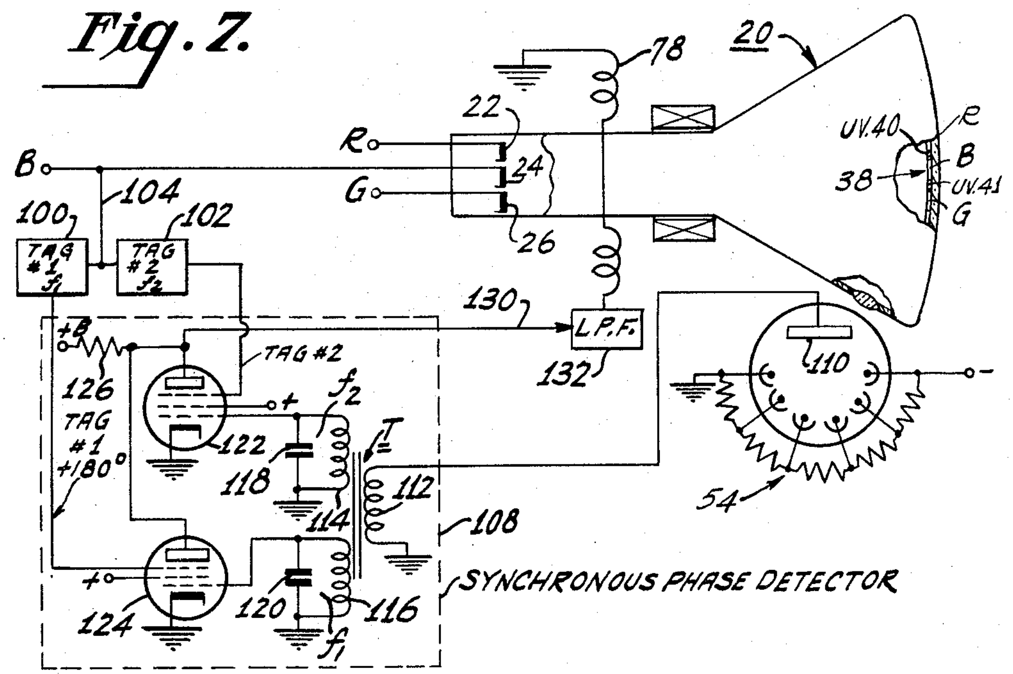
Figs. 7 and 8 illustrate, by way of a block and schematic diagrams, color television receivers in accordance with additional forms of the invention.

Figure 7 illustrates, by way of a block and schematic diagram, another color television image-reproducing arrangement embodying the principles of the present invention, in accordance with a second form thereof. Since the kinescope 20 in Fig. 7 may be identical to that shown by the corresponding reference numeral in Fig. 1, no further description of its parts is required. It may, however, be noted that red, green and blue video signals are applied to its cathodes 22, 24 and 26 respectively. Again, as in the case of Fig. 1, the blue light emitting phosphor strips are separated from adjacent red and green phosphor strips by slow and fast ultra-violet light emitting phosphor strips 40 and 41. According to the form of the invention shown in Fig. 7, the green electron beam serves as the guiding beam but is modulated by two separate tag frequencies in addition to its modulation by the green-representative video signals. The basis of the apparatus of Fig. 7 is that a phosphor with a very short decay time constant (e.g., the phosphor 41) will show relatively less amplitude attenuation of a high frequency tag signal than one with a longer time constant (e.g., the phosphor 40). Hence, when two such phosphors are used, as in the present case, and two tag signals $f_1$ and $f_2$ are simultaneously applied to an electron beam, the ratio of the higher frequency tag signal amplitude to the amplitude of the lower frequency tag signal in the phototube circuit is a direct indication of the position of the electron beam thus tagged. The amplitude response of typical phosphors is, as has been pointed out, illustrated generally in Fig. 3.

In accordance with the arrangement as shown in Fig. 7, the two frequencies are preferably chosen in an anharmonic relation such, for example, that tag signal No. 1 ($f_1$) as supplied by the oscillator 100 is equal to seven megacycles per second and tag signal ($f_2$) of the oscillator 102 is equal to ten mc. s. The two tag signals $f_1$ and $f_2$ are added in a lead 104 and applied to the cathode 24, so that the green electron beam is modulated by the green video signal, tag signal No. 1 of 7 mc. s. and tag signal No. 2 of 10 mc. s. The operation of the arrangement of Fig. 7 may be illustrated mathematically as follows.

Let $f_H$ be the high frequency tag signal and $f_L$ the low frequency tag, while $R_{1H}$ and $R_{1L}$ are the responses of one phosphor and $R_{2H}$ and $R_{2L}$ are the responses of the other phosphor. When $\alpha$ is the tag beam current to one signal phosphor and B that to the other, the combined feedback signal has the form:

$$(\alpha R_{1H}+BR_{2H}) \sin (2\pi f_H t) + (\alpha R_{2L}+BR_{2L}) \sin (2\pi f_L t+\phi)$$

The high and low frequency signal amplitudes, $A_H$ and $A_L$ are thus detectable and are:

$$A_H=\alpha R_{1H}+BR_{2H}$$
$$A_L=\alpha R_{1L}+BR_{2L}$$

The terms $R_{1H}$, $R_{2H}$, $R_{1L}$ and $R_{2L}$ are constants whose relative values are fixed and known and whose absolute values are not of direct significance. It follows, therefore, that $$\alpha=\frac{A_H R_{2L}-A_L R_{2H}}{R_{1H}R_{2L}-R_{1L}R_{2H}}$$

$$B=\frac{A_L R_{1H}-A_H R_{1L}}{R_{1H}R_{2L}-R_{1L}R_{2H}}$$

Hence, an error signal proportional to $\alpha-B$ has the form:

$$\alpha-B=C_1A_H-C_2A_L$$

and the constants $C_1$ and $C_2$ are:

$$C_1=\frac{R_{2L}-R_{1L}}{R_{1H}R_{2L}-R_{1L}R_{2H}} \qquad C_2=\frac{R_{2H}-R_{1H}}{R_{1H}R_{2L}-R_{1L}R_{2H}}$$

The choice of phosphors and/or tag frequencies should be such that the following expression is satisfied:

$$\frac{R_{1H}}{R_{1L}}\neq\frac{R_{2H}}{R_{2L}}$$

As the beams of the kinescope 20 in Fig. 7 scan the screen 38 as shown in Fig. 2, that is, with the blue electron beam 34 centered between the ultra-violet light emitting strips 40 and 41, the ratio of the amplitude of the higher frequency tag signal (i.e., tag No. 2) to the amplitude of the lower frequency tag signal No. 1 as those signals appear in the circuit of the phototube 54 will be a fixed amount. As the beams erroneously move upwardly, for example, so that the beam 34 impinges more upon the ultra-violet strip 40 than upon the strip 41, the ratio of high frequency tag amplitude to low frequency tag amplitude will decrease, since the longer persistence of the phosphor strip 40 will cause an attentenuation of the high frequency tag signal. Conversely, if the beams move downwardly so that the beam 34 impinges more upon the ultra-violet strip 41 than upon the strip 40, the ratio will increase, since the fast phosphor strip 41 produces less attenuation of the higher frequency tag signal No. 2.

The amplitudes of the tag signal components of the ultra-violet light received by the photocell 54 are detected through the agency of a synchronous detector illustrated within the dotted line rectangle 108. Specifically, and by way of example, the anode 110 of the photomultiplier tube 54 is connected to the primary winding 112 of a transformer "T" which has first and second secondary windings 114 and 116, respectively. The secondary windings 114 and 116 are tuned by capacitors 118 and 120 to tag frequencies No. 2 and No. 1 and are connected to the control electrodes, respectively, of the synchronous detector tubes 122 and 124. The anodes of the tubes 122 and 124 are connected to a common lead impedance 126. The suppressor grid of tube 122 is supplied with a fixed reference phase of tag signal No. 2, while the suppressor grid of tube 124 receives a wave having a fixed relation to the phase of tag signal No. 1, but displaced by 180° therefrom. The anodes of the two tubes are connected via a lead 130 to the input terminal of a low pass filter 132 which removes the tag signal frequencies from the output of the detectors and applies the resultant correction signal to the correction winding 78.

In the operation of the apparatus of Fig. 7, an erroneous upward movement of the guiding beam in the tube will result in an attenuation of the amplitude of tag signal No. 2 as received by the phototube 54, which fact will be detected by the tube 124 which detects synchronously the amplitude of tag No. 1. Such a situation would result in an increased voltage at the anode of the tubes, thereby furnishing a signal to the lowpass filter for application to the correction winding 78. Such increased voltage may be assumed as that required for lowering the electron beams to their proper position. An erroneous downward shift of the beams in the tube will result, on the other hand, in an increase in the amplitude of the tag No. 2 component of the ultra-violet light signal, which fact will be detected by the tube 122, thereby resulting in a lowered anode voltage. Such lowered anode voltage is applied via the lead 130 to the low pass filter and, in turn, to the winding 78 for moving the beams upwardly to their correct position.

Figure 8:
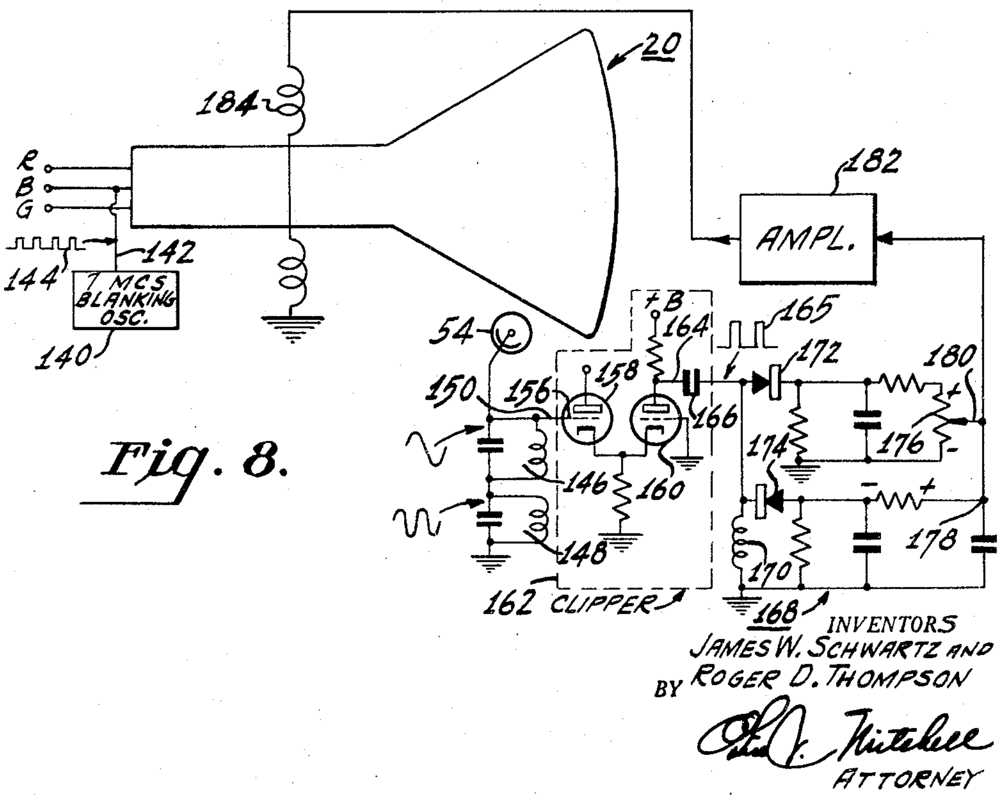

While the arrangement of Fig. 1 exploits the different delay (i.e., phase shift) characteristics of phosphors having different persistence or decay time constants and the embodiment of Fig. 7 utilizes the amplitude versus frequency response of phosphors having different persistence characteristics, the form of invention illustrated in Fig. 8 takes advantage of the relative variations in both phase- and amplitude-versus-frequency response of different phosphor index signal-generating elements and, specifically, such responses at a tag frequency and one or more harmonics thereof. In Fig. 8, there is illustrated diagrammatically a kinescope 20 which may be identical to the kinescope of Fig. 1 and Fig. 7. The three electron beams in the kinescope are respectively modulated with red, blue and green representative video signals, as in the case of the first-described arrangement. The blue electron beam in Fig. 8 is, however, subjected to a high frequency tag modulation as illustrated by the block 140 which bears the legend "7 mc. s. blanking oscillator." That is to say, the oscillator 140 provides at its output lead 142 a series of positive going pulses 144 at a 7 mc. s. pulse repetition frequency which are applied to the blue electron beam emitting cathode, which pulses extinguish the blue electron beam at a 7 mc. s. pulse repetition rate. Since, as has been stated, the arrangement of Fig. 8 depends upon both the phase and amplitude response of the different index signal-generating phosphor strips to a fundamental wave and at least one of its harmonics, the rectangular form of tag modulation is employed in order to maintain effectively the relative phase and amplitude of the fundamental and its harmonics of the electron beam current wave shape, notwithstanding the changes of beam current as a function of viodeo modulation. Stated otherwise, this form of tag modulation is employed to preserve the harmonic phase and amplitude relationship, thereby compensating for the fact that a kinescope normally has a non-linear dynamic transfer characteristic.

As will be further appreciated from the showings of Figs. 3 and 4, the fast ultra-violet light phosphor strip 41 of a kinescope will produce less phase shift and less attenuation of the amplitude of the second harmonic of the tag signal than is the case with the slow phosphor strip 40. Thus, assuming that the beams within the tube 20 are caused to scan in the manner described in connection with Figs. 1 and 7, it will be appreciated that when the beams erroneously shift downwardly from their proper positions so that the blue beam impinges more on a fast phosphor 41 than on the slow phosphor strip 40 there will be less phase shift of the second harmonic of the tag signal and less attenuation of its amplitude than when the beams are properly scanning. Conversely, when the beams erroneously move upwardly so that the blue beam impinges more upon the slow phosphor strip 40, the phase of the second harmonic of the tag signal will be shifted a greater amount from its reference phase and its amplitude will be more greatly attenuated.

Figure 9:
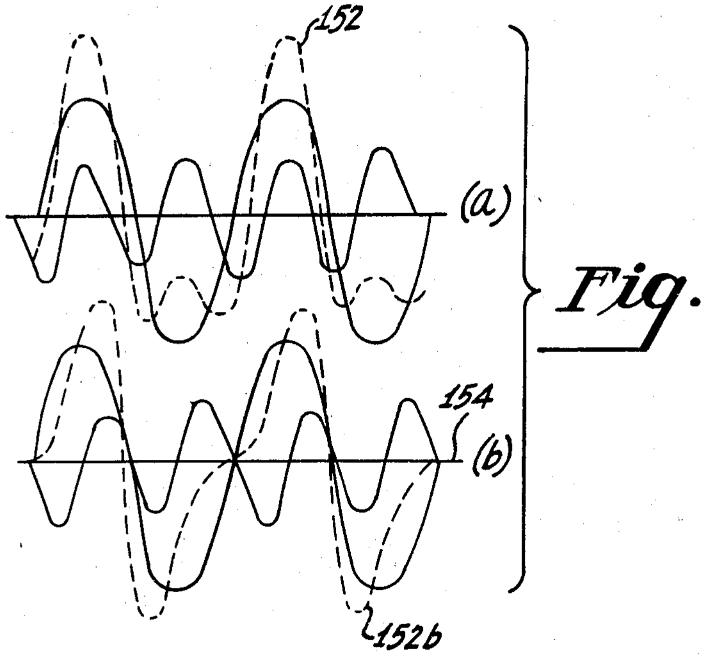
Fig. 9 illustrates certain waveforms to be described in connection with the apparatus of Fig. 8.

In Fig. 8, the ultra-violet light signals produced within the kinescope 20 are received by a phototube 54 and the resultant currents are applied to the parallel resonant circuits 146 and 148 which are tuned, respectively, to the fundamental (7 mc. s.) frequency of the tag modulation of the green electron beam and to the second harmonic thereof (i.e., 14 mc. s.). The composite curves (*a*) and (*b*) of Fig. 9 illustrate the fundamental and harmonic waveforms produced across the two circuits 146 and 148. By virtue of the series conection of the two circuits 146 and 148, the fundamental and second harmonic of the tag frequency are added so that their resultant appears at the lead 150. The curves of Fig. 9(*a*) illustrate the resultant wave which is produced by the addition of a fundamental sine wave and its second harmonic when the two are "in phase" (as shown by the fact that their positive peaks coincide). The resultant wave 152 (indicated in dotted lines) is asymmetrical, having narrower and higher positive peaks than the negative peaks. On the other hand, the resultant wave 152*b* of Fig. 9(*b*) is the result of the addition of the sine wave and its second harmonic when the latter is 90° displaced in phase from its fundamental. In this latter case, it will be seen that the resultant wave 152*b* is generally symmetrical about its A.C. axis 154 (i.e., its positive and negative portions are equal height and duration).

Assuming, for the purposes of illustration, that the curves of Fig. 9(*a*) are illustrative of the condition which exists when the electron beams in the kinescope 20 are too low, so that the tag beam impinges more upon the fast phosphor and that the curves of Fig. 9(*b*) are indicative of the condition which exists when the beams are too high so that the tagged beam impinges mostly upon the slow phosphor 40, the following described apparatus of Fig. 8 is provided for the detection of the phase and amplitude of the second harmonic of the tag frequency with respect to the fundamental frequency. The resultant wave appearing at the lead 150 is applied to the control electrode 156 of one of the two tubes 158 and 160 forming a conventional double ended clipper stage 162.

Since the operation of such a clipper is well-known to those skilled in the art, it need not be described in detail here. It may be noted, however, that the doubly clipped resultant wave is available at the lead 164 connected to the anode of the tube 160. The clipped wave indicated by the waveform 165 is applied via a capacitor 166 to a detector circuit 168 having a low impedance input circuit indicated by the choke coil 170.

The detector circuit 168 comprises the oppositely polarized diodes 172 and 174, each of which has connected thereto an output or load circuit including filtering means. It will, therefore, be understood that the diode 172 detects the positive peaks of the clipped wave 165 to provide across its output resistor 176 a direct current voltage proportional to the positive peak thus detected. Similarly, the diode 174 detects the negative peak of the waveform 165 to provide at its output terminal 178 a voltage proportional to the negative peak of the wave. The voltage appearing at the terminal 178 is adjustable added to the voltage across the resistor 176 via an adjustable connection 180. The algebraic sum of the two output voltages of the detectors 172 and 174 is, therefore, a measure of the relation of the positive peaks of the clipped wave to the negative peaks thereof which is, in turn, indicative of the relative phase and amplitude of the second harmonic of the tag frequency with respect to the fundamental. This final indication is representative, moreover, and as has been explained, of the position of the tagged beam with respect to the slow and fast phosphor strips which constitute the index signal-producing elements of the kinescope 20. Thus, the voltage appearing at the terminal 180, when suitably amplified by a circuit 182, is suitable for application to the beam position correcting winding 184, since the adjustable connection 180 may be set to maintain the beams centered when the phase and amplitude of the second harmonic wave produced across the circuit 148 are between those indicated by the curves (*a*) and (*b*) of Fig. 9.

In the interest of completeness of description, it will be noted that ultra-violet light-emitting phosphors having different persistence characteristics and suitable for use, respectively, as the slow and fast phosphor strips 40 and 41 in Figs. 1, 7 and 8 are as follows:

Slow: $CaMgPO_4$:Ce (known in the art as "P–16") (calcium-magnesium-phosphate, cerium-activated)
Fast: $KBaPO_4$:Ce (potassium-barium-phosphate, cerium-activated)

While, in the several arrangements described herein, the guiding beam is illustrated as the central one of the several electron beams and, therefore, the beam intended for scansion along the central one of the three color light-emitting phosphor strips of a group, other arrangements may be employed. Thus, for example, the guiding beam may be the uppermost or the lowermost one of the several beams, in which event the index elements would be associated with the color light-emitting strip which is to be scanned by that beam. By way of illustration, if the guiding beam is to be the lowermost one of the beams, the phosphor strip arrangement might be in the following sequence: R, G, UV–40, B UV–41. In such a case, the guiding bean would be tagged in addition to its modulation by the blue-representative video signal. The relative sequence of the phosphors R, G and B may also be varied to suit different requirements. It is also to be noted that, although the beam intensity modulation has been illustrated by applying the modulating signals to the cathodes of the kinescope in each of the arrangements shown, the signals may be applied, with the proper polarity, to individual control grid electrodes.

Having thus described our invention, what we claim as new and desire to secure by Letters Patent is:

1. Image scanning apparatus which comprises: a cathode ray tube having a target which includes first and second parallel index signal-producing elements and means for directing a plurality of scanning electron beams toward said target, one of which beams is tagged, said elements being arranged on said target in a fixed relation to the desired scanning paths of such beams; means associated with said tube for deriving index signals from said elements in response to electron impingement thereon, said first and second elements being formed of materials having respectively different responses to impingement by such tagged beam, whereby the character of such index signals is different when produced by impingement of the tagged beam upon one of said elements from its character when produced by impingement upon the other of said elements so that the character of such index signals is indicative of the position of such tagged beam relative to said elements; and means associated with said tube for controlling the position of such beams in response to such index signals.

2. Image scanning apparatus which comprises: a cathode ray tube having a target which includes first and second spaced, generally parallel index signal-producing elements and means for causing an electron beam to scan along a path parallel to and between said elements;

means coupled to said tube for modulating such beam with image signals; means coupled to said tube for modulating such beam with a distinctive tag signal; means associated with said tube for deriving index signals from said elements, said elements having respectively different responses to impingement by such beam so that such index signals are indicative of the position of such beam with respect to said elements; and means for controlling the position of such beam in response to such index signals.

3. Image scanning apparatus which comprises: a cathode ray tube having a target which includes first and second parallel strip-like elements of cathodo-luminescent material of respectively different persistence characteristics and means for directing a scanning electron beam toward said target, said elements being arranged on said target in a fixed relation to the desired scanning path of such beam; means associated with said tube for modulating the intensity of such electron beam with a distinctive alternating current tag signal; light-responsive means for deriving index signals from said strip-like elements, said elements having respectively different phase-shift characteristics at the frequency of said tag signal; and means coupled to said light-responsive means and operatively associated with said tube for controlling the position of such electron beam in accordance with the relative phase of such index signals.

4. The invention as defined by claim 3 wherein said last-named means comprises a phase detector circuit coupled to said beam-modulating means for receiving signals therefrom and for comparing the phase of such index signals with a reference bearing a fixed relation to such tag signal.

5. Image reproducing apparatus which comprises: a cathode ray tube having a target which includes first and second parallel strip-like elements of cathodo-luminescent material of respectively different amplitude-versus-frequency response characteristics to electron impingement and means for directing a scanning electron beam toward said target, said elements being arranged on said target in a fixed relation to the desired scanning path of such beam; means associated with said tube for modulating the intensity of such beam with first and second alternating current tag signals of different frequency; light-responsive means for deriving index signals from said strip-like elements in response to electron beam impingement thereon; and means coupled to said light-responsive means and in association with said tube for controlling the position of such beam in accordance with the relative amplitudes of the components of such index signals of said different tag frequencies.

6. Image scanning apparatus which comprises: a cathode ray tube having a target which includes first and second parallel strip-like elements of cathodo-luminescent material and means for directing a scanning electron beam toward said target, said elements being arranged on said target in a fixed relation to the desired scanning path of such beam; means associated with said tube for modulating the intensity of such beam with a distinctive alternating current tag signal; light-responsive means for deriving index signals from said strip-like elements in response to electron impingement thereon, said elements having respectively different persistence characteristics such that their phase-versus-frequency responses to the frequency of such modulating tag signal and a harmonic thereof are different, whereby at least one of the phase and amplitude characteristics of components of such index signals of such tag frequency and said harmonics is different depending upon the position of such beam relative to such strip-like elements; and means coupled to said light-responsive means and associated with said tube for controlling the position of such beam in accordance with such characteristics of such index signals.

7. Color television receiver apparatus which comprises: a color kinescope having a target screen made up of a plurality of horizontally oriented strip-like elements of respectively different color light emitting characteristics and first and second parallel strip-like index elements of cathodo-luminescent material and means for directing a plurality of scanning electron beams toward said target, said index elements being arranged generally parallel to said color elements; means for modulating said beams respectively with color-representative video signals; tagging means for modulating one of such beams additionally with a distinctive alternating current tag signal; and light-responsive phototube means for deriving index signals from said strip-like index elements, said index elements having respectively different delay characteristics at the frequency of such alternating current signal so that the phase of such index signals relative to a reference is indicative of the position of such electron beam relative to said index elements; a phase-detector circuit associated with said phototube means and said tagging means for detecting the phase of such index signals relative to the phase of such tag signal and for producing a correction signal indicative thereof; and electromagnetic deflection means operatively associated with said kinescope and coupled to said phase detector to receive such correction signal and to control the position of such beams in accordance with such correction signal.

8. In a color television receiver, a color kinescope having a target screen made up of a plurality of horizontally oriented strip-like elements of respectively different color light-emitting characteristics and first and second horizontally oriented strip-like index elements of cathodo-luminescent ultra-violet light emitting materials and means for directing a plurality of scanning electron beams toward said target; means associated with said kinescope for modulating one of said electron beams with a distinctive alternating current tag signal; and light-responsive means for deriving index signals from said index elements, said ultra-violet light emitting materials having respectively different response characteristics at the frequency of such tag signal so that the character of such index signals is indicative of the position of such electron beams relative to said index elements.

9. In a color television receiver, a color kinescope having a target screen made up of a plurality of horizontally oriented, strip-like phosphor elements of respectively different color light-emitting characteristics and first and second horizontally-oriented strip-like index signal-producing elements of cathodo-luminescent ultraviolet light-emitting materials and means for directing a scanning electron beam toward said target, said index elements being arranged generally parallel to said color phosphor elements; tagging means for modulating such beam with a distinctive alternating current tag signal; a phototube responsive to ultraviolet light for deriving index signals from said index elements, said index elements having respectively different delay characteristics at the frequency of such alternating current tag signal, such that the phase of such index signals relative to the phase of such tag signal is indicative of the vertical position of such electron beam relative to said index element; a phase detector circuit associated with said phototube and coupled to said tagging means for receiving signals therefrom and for detecting the phase of such index signals relative to the phase of such tag signal to produce a correction signal indicative of such relative phase; an electromagnetic deflection winding operatively associated with said kinescope for controlling the vertical position of such beam therein; and means for applying such correction signal from said phototube to said deflection winding to energize said winding with such correction signal.

10. The invention as defined by claim 9 wherein said last-named means comprises a lowpass filter.

11. Image reproducing apparatus which comprises: a cathode-ray tube having a target which includes first and second, generally parallel strip-like elements of cathodo-luminescent materials of respectively different amplitude-versus-frequency response characteristics to electron impingement and means for directing a scanning electron toward said target, said elements being arranged on said target in a fixed relation to desired scanning path of such beam; means associated with said tube for modulating the intensity of such beam with first and second alternating current tag signals of different frequency; light responsive means for deriving index signals from said strip-like elements in response to electron impingement thereon; an amplitude detecting circuit operatively coupled to said light responsive means for detecting the relative amplitude of such index signals of such different frequencies to provide a correction signal in accordance with the relative amplitudes of the components of such index signals of said different frequencies; and a deflection winding operatively assoicated with such tube and coupled to said last-named means for receiving such correction signals therefrom and for controlling the position of such beam in accordance with such signal.

References Cited in the file of this patent

UNITED STATES PATENTS

| | | |
|---|---|---|
| 2,310,863 | Leverenz | Feb. 9, 1943 |
| 2,621,244 | Landon | Dec. 9, 1952 |
| 2,648,722 | Bradley | Aug. 11, 1953 |
| 2,671,129 | Moore | Mar. 2, 1954 |
| 2,701,821 | Alexanderson | Feb. 8, 1955 |
| 2,750,533 | Schwartz | June 12, 1956 |
| 2,752,418 | Clapp | June 26, 1956 |
| 2,773,118 | Moore | Dec. 4, 1956 |
| 2,782,252 | Fedde | Feb. 19, 1957 |

OTHER REFERENCES

Television Engineering Handbook, by Fink, 1st Edition, 1957, pages 5–24.